United States Patent
Balzanelli

(10) Patent No.: US 8,944,359 B2
(45) Date of Patent: Feb. 3, 2015

(54) MACHINE FOR WINDING PAIRS OF TUBES PARALLEL TO AN ADVANCING DIRECTION AND INDEPENDENT OF EACH OTHER

(75) Inventor: Vincenzo Balzanelli, Milan (IT)

(73) Assignee: F.B. Balzanelli Avvolgitori S.p.A., Milan (IT)

( * ) Notice: Subject to any disclaimer, the term of this patent is extended or adjusted under 35 U.S.C. 154(b) by 569 days.

(21) Appl. No.: 13/278,668

(22) Filed: Oct. 21, 2011

(65) Prior Publication Data
US 2012/0097782 A1    Apr. 26, 2012

(30) Foreign Application Priority Data

Oct. 22, 2010    (IT) ............................... MI2010A1944

(51) Int. Cl.
| | |
|---|---|
| B65H 54/02 | (2006.01) |
| B65H 54/58 | (2006.01) |
| B65H 51/14 | (2006.01) |
| B65H 54/28 | (2006.01) |
| B65H 57/16 | (2006.01) |
| B65H 75/28 | (2006.01) |
| F24J 3/08 | (2006.01) |

(52) U.S. Cl.
CPC ............... B65H 54/58 (2013.01); B65H 51/14 (2013.01); B65H 54/026 (2013.01); B65H 54/28 (2013.01); B65H 57/16 (2013.01); B65H 75/28 (2013.01); B65H 2701/33 (2013.01); F24J 3/083 (2013.01); Y02E 10/125 (2013.01)
USPC ................... 242/472.8; 242/476.6; 242/586.4

(58) Field of Classification Search
CPC ........ B65H 51/14; B65H 51/18; B65H 54/28; B65H 54/026; B65H 54/58; B65H 75/28; B65H 57/16; B65H 2701/33
USPC ............. 242/418, 472.8–473.3, 476.1, 476.6, 242/579, 586, 586.4–586.6, 125–125.1, 242/157 R
See application file for complete search history.

(56) References Cited

U.S. PATENT DOCUMENTS

| | | | | |
|---|---|---|---|---|
| 4,289,558 | A | * | 9/1981 | Eichenbaum et al. ......... 156/179 |
| 4,390,137 | A | * | 6/1983 | Hammond et al. ............ 242/470 |
| 4,508,251 | A | * | 4/1985 | Harada et al. .................... 226/25 |

(Continued)

FOREIGN PATENT DOCUMENTS

| | | | | |
|---|---|---|---|---|
| DE | | 1967962 U | * | 9/1967 |
| DE | | 2743074 A | * | 3/1979 |

(Continued)

*Primary Examiner* — William E Dondero
(74) *Attorney, Agent, or Firm* — Mintz Levin Cohn Ferris Glovsky and Popeo, P.C.

(57) ABSTRACT

A machine for winding pairs of tubes which are parallel to an advancing direction (Y-Y) and independent of each other in the longitudinal direction (X-X) of rotation of a reel connected to the machine comprising an apparatus for feeding and guiding the pair of tubes, formed by: a suitable pulling device arranged upstream of the reel in the direction of advancing movement of the tubes and intended to feed the two tubes in the transverse direction (Y-Y) as far as the point of entry thereof onto the winding reel; a tube-guiding device which is arranged in-line and downstream of the pulling device in the direction of advancing movement of the tubes and the internal seat of which is able to contain the two tubes arranged alongside each other in the advancing direction (Y-Y) and guided in the radial direction (Z-Z).

12 Claims, 4 Drawing Sheets

(56) References Cited

U.S. PATENT DOCUMENTS

| | | | |
|---|---|---|---|
| 5,511,742 A * | 4/1996 | DeMasters | 242/470 |
| 2006/0196984 A1* | 9/2006 | Higeta | 242/176 |
| 2014/0014775 A1* | 1/2014 | Luthi et al. | 244/129.1 |
| 2014/0070043 A1* | 3/2014 | Naipany | 242/472.8 |

FOREIGN PATENT DOCUMENTS

| | | | |
|---|---|---|---|
| DE | 3212542 A1 | * | 10/1983 |
| JP | 04308166 A | * | 10/1992 |
| LU | 79098 A1 | * | 9/1978 |
| WO | WO 9214669 A1 | * | 9/1992 |

* cited by examiner

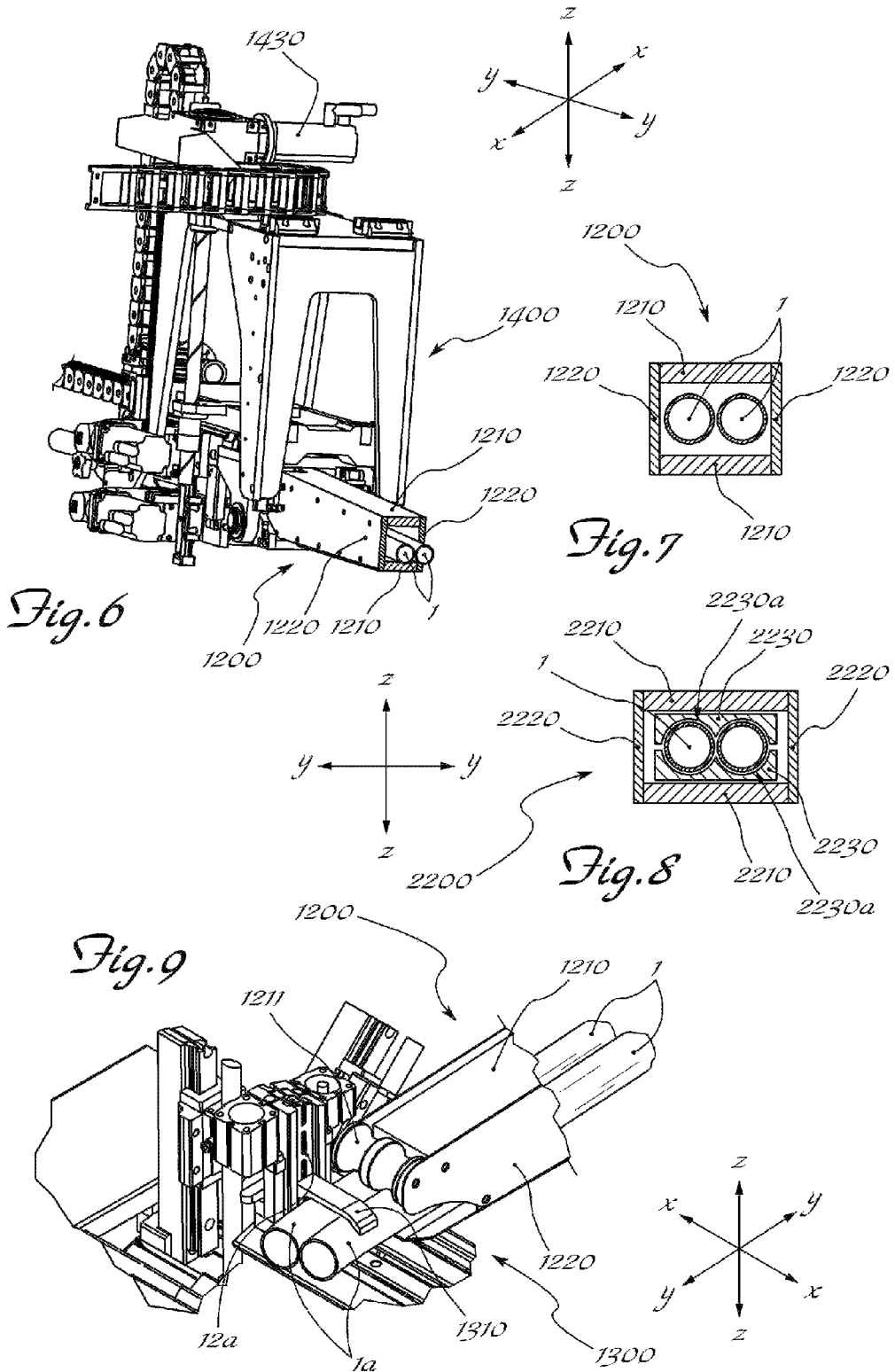

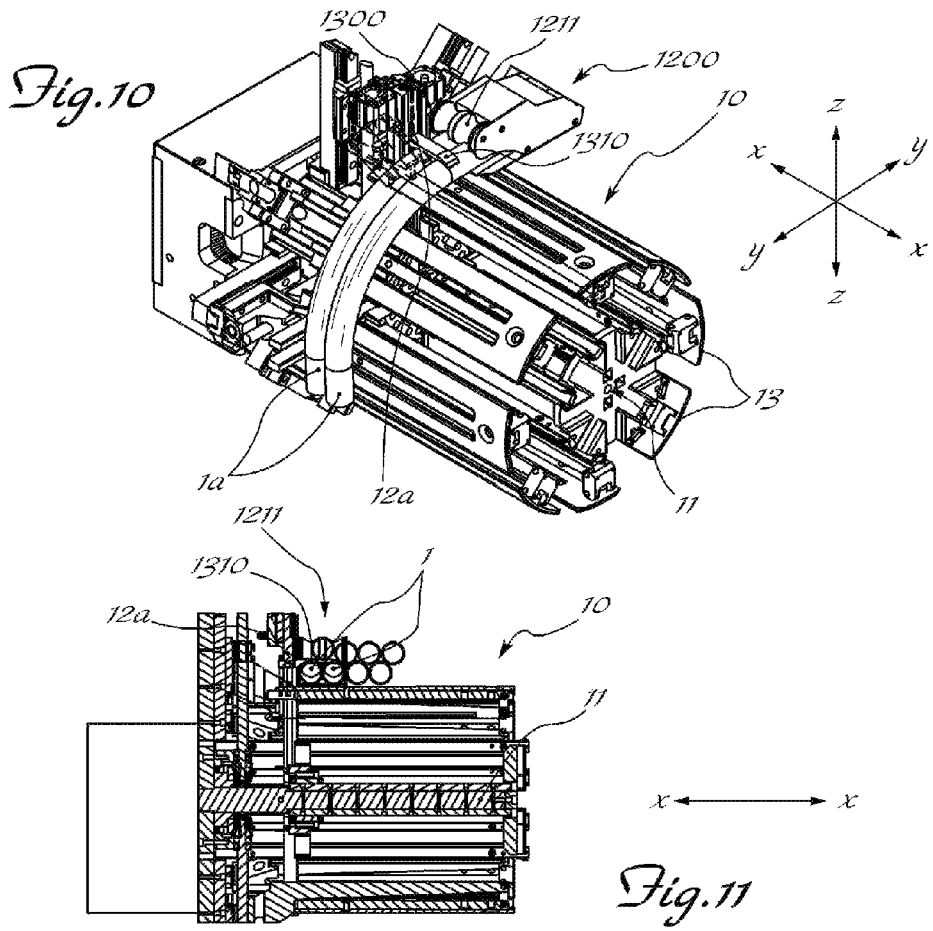
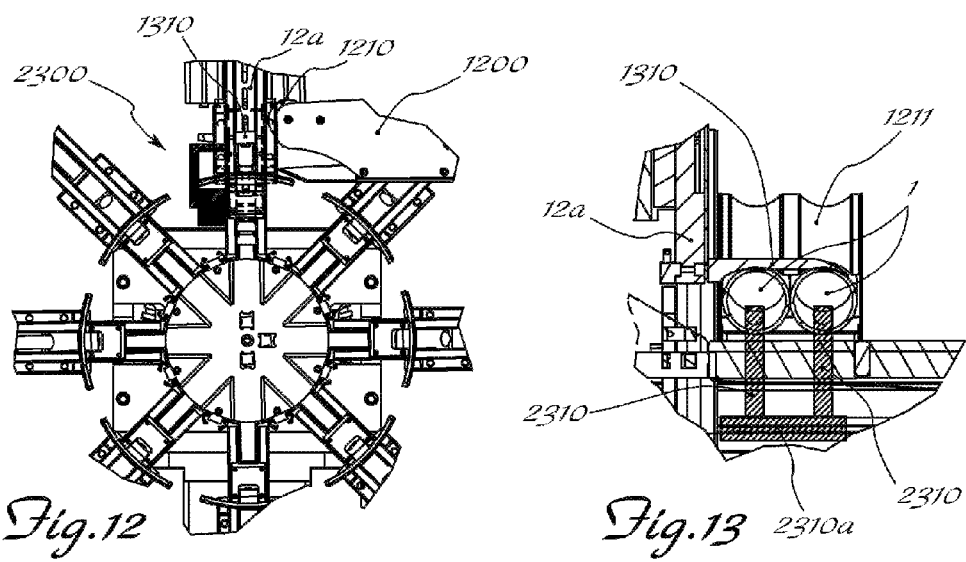

MACHINE FOR WINDING PAIRS OF TUBES PARALLEL TO AN ADVANCING DIRECTION AND INDEPENDENT OF EACH OTHER

CROSS-REFERENCE TO RELATED ACTIONS

This application claims the benefit of and priority to Italian Patent Application No. MI2010A001944, filed Oct. 22, 2010, which is incorporated by reference herein in its entirety.

BACKGROUND

It is known in the technical sector relating to the winding of tubes, hanks, spools and the like that these are obtained by winding the hank onto a rotating reel and it is also known that the rotating part of the reel comprises a drum formed by slats which are parallel to the axis of rotation and mounted on radial arms rotating with a motor-driven hub.

It is also known that in the art different designs of winders for automatically winding tubes made of plastic and other materials exist, these winders operating with a completely automatic cycle comprising substantially the following steps:
 automatic engagement of the tube to be wound onto the reel by means of an associated mechanical device;
 automatic activation of the winding step during which a second tube-guiding device distributes the tube onto the rotating reel attempting as far as possible to distribute the tube in a staggered ("quinconce") arrangement;
 cutting the tube automatically when the set winding length is reached;
 fastening and packaging of the finished coil as defined by the operator;
 once the coil has been packaged, automatic unloading of the roll produced, which therefore has the appearance of a perfectly wound tube of the desired length ready for palletization.

A particular example of use of this winding technique consists in the production of tubes for the geothermal sector where it is required to insert into the ground drilling rig two parallel tubes arranged in pairs with their ends connected together by means of a U-shaped sleeve applied by means of hot-melting or some other method.

Since only rolls consisting of a single wound tube are available, the installation engineer is therefore obliged to manage and handle two separate rolls of tube of the same type, color, size, and length in order to locate the respective end section of each tube (namely the ends on the outside of the roll) and join them together by means of the said U-shaped sleeve.

Devices are for example known from LU 79098 A1 and DE 27 43 074 A1.

SUMMARY

The present disclosure relates to a machine for winding pairs of tubes parallel to an advancing direction and independent of each other in the longitudinal direction of rotation of a reel connected to the machine. End users have the need for a finished product composed of a single roll consisting of two ready-wound tubes which are joined together and ready for insertion into the drilling rig, thus also allowing the manufacturer to handle once only a single roll, without having to arrange it on other rolls in order to apply the sleeve to the ends of the said tube.

One technical problem which is posed, therefore, is that of providing a machine able to allow automatic winding, without the aid of an operator, of two tubes arranged alongside each other and not joined mechanically together in the direction transverse to the advancing direction by means of adhesive tape, external plastic sheathing, strap-like ties or additional polyethylene molded fastenings used to mechanically join together the two tubes before the winding step.

These results can be achieved according to the present disclosure by a machine for winding pairs of tubes parallel to an advancing direction and independent of each other in the longitudinal direction of rotation of a reel connected to the machine.

In general, in an aspect, embodiments of the invention can provide a machine for winding pairs of tubes which are parallel in an advancing direction (Y-Y) and independent of each other in a longitudinal direction (X-X) of a rotation of a reel connected to the machine, the machine including an associated motor arranged upstream of the reel relative to the direction of advancing movement of said tubes, a pulling device comprising a pair of belts each endlessly wound onto an idle roller and onto a motor-driven roller, the pair of belts being rotationally driven by the associated motor, the pulling device being configured to feed said tubes in the transverse direction (Y-Y) as far as the point of entry thereof onto the winding reel, a tube-guiding device that is arranged in-line and downstream of the pulling device, relative to the direction of advancing movement of said tubes, the tube-guiding device including an internal seat that is able to contain said tubes arranged alongside each other in the advancing direction (Y-Y) and guided in the radial direction (Z-Z), an engaging device configured to grip free ends of said tubes when said tubes enter onto the reel and i) retain said ends during winding and ii) release said tubes once winding has been completed, and a computer configured to control, synchronize, and perform the movements of the different parts and the machining sequences, wherein the pair of belts are configured with concavities corresponding to the convexities of the tubes.

Embodiments of the invention include one or more of the following features. The pair of belts is connected to an adjustment mechanism configured to adjust the relative distance between the pair of belts. The pair of belts are arranged opposite each other on either side of the tube in the vertical direction (Z-Z). The pair of belts are arranged opposite each other on either side of the tube in the horizontal direction (X-X). The pair of belts are flat. The tube-guiding device includes two parallel plates arranged opposite the tubes in the vertical direction (Z-Z), and two side walls, the two parallel plates and the two side walls defining a section of the tube-guiding device that is configured to retain and guide said tubes both in the vertical direction (Z-Z) and in the longitudinal direction (X-X). The tube-guiding device comprises two vertical flanks and two plates having, coupled therewith, two half-guides arranged in contact with the outer surface of the tubes.

Embodiments of the invention also include or more of the following features. The inner surface of the two half-guides has two recesses corresponding to the convexity of the tube to be fed to the reel. The feeding device and tube-guiding device are mounted on a structure movable in both senses of the longitudinal direction X-X upon operation of a respective first drive system and in both senses of the vertical direction (Z-Z) upon operation of a third drive system. The structure is movable in both senses of the advancing direction (Y-Y) upon operation of a second drive system. The engaging device comprises a finger which is connected to an arm of the reel and operated in both senses of the radial direction (Z-Z) by pneumatic or mechanical means so as to open and allow the entry of the tubes onto the reel and grip the outer surface of the said tubes so as to ensure retention thereof in the longitudinal direction (X-X) and radial direction (Z-Z). The retaining device comprises two independent hooks which are moved by an associated actuating system so as to cause the entry of each hook inside the respective tube in the direction (Y-Y) of advancing movement of the latter.

Various aspects of the invention provide one or more of the following capabilities. Pairs of tubes parallel to an advancing direction that are independent of one another can be wound. Tubes used in the geothermal sector can be produced. A single roll consisting of two ready-wound tubes which are joined together and ready for installation can be provided.

These and other capabilities of the invention, along with the invention itself, will be more fully understood after a review of the following figures, detailed description, and claims.

BRIEF DESCRIPTION OF THE FIGURES

FIG. 6: shows a perspective view from the reel side of the tube-guiding device;

FIG. 7: shows a schematic cross-section through the tube-guiding device according to FIG. 6;

FIG. 8: shows a schematic cross-section through a second embodiment of the tube-guiding device;

FIG. 9: a perspective view of a detail of the reel/tube-guide joining zone and the device for holding in position the pair of tubes during entry of the pair of tubes onto the reel;

FIG. 10: shows a perspective view, similar to that of FIG. 9, during winding of the pair of tubes;

FIG. 11: shows a side view of the reel during winding;

FIG. 12: shows a front view of the reel with a second example of embodiment of the tube-retaining device; and FIG. 13: shows a side view of the detail of the retaining means according to FIG. 12.

DETAILED DESCRIPTION

As shown, and assuming solely for the sake of convenience of description and without any limitation of meaning, a set of three reference axes in a longitudinal direction X-X, corresponding to the axis of rotation of the reel, transverse direction Y-Y, corresponding to the advancing direction of the tubes, and radial direction Z-Z, respectively.

Figure 1:
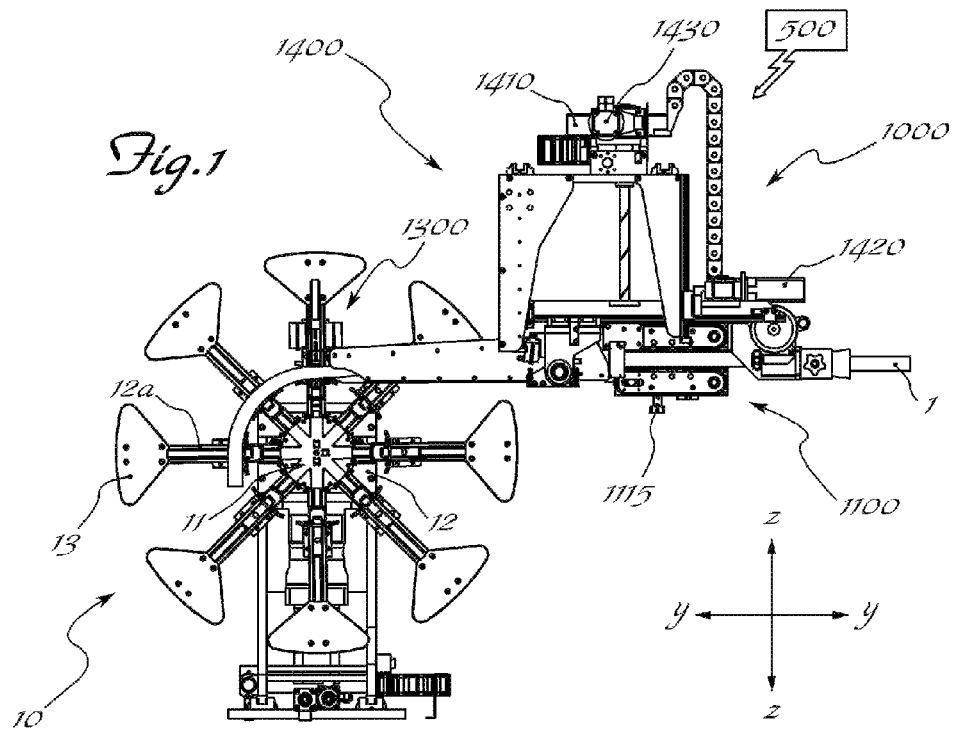
FIG. 1: shows a front view of a machine for winding two tubes arranged in pairs, but not fastened together.

Referring to FIG. 1, a machine for winding at least one pair of loose tubes 1, which are parallel to each other and in contact in the longitudinal direction X-X, includes a rotating reel 10 formed by a central shaft 11 rotating about an axis of axial rotation X-X, and a cross-piece 12 mounted on said shaft 11. The radial arms 12a of the cross-piece 12 can have a respective end petal 13 for retaining, in the axial direction, the hank being wound. The reel 10, since it is conventional per se, is not described in greater detail.

Figure 2:
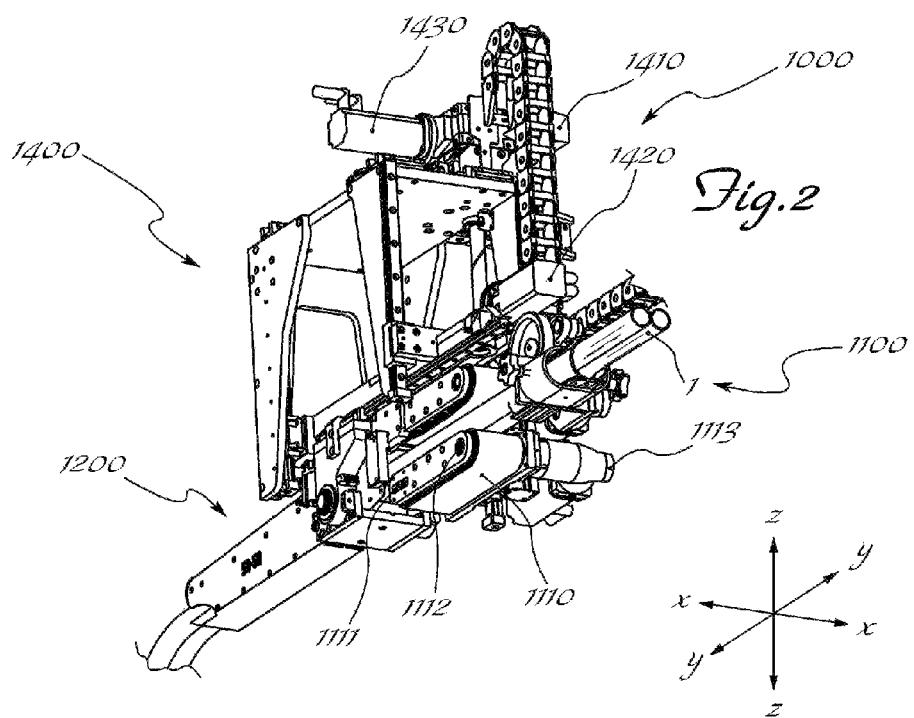
FIG. 2: shows a perspective view from below of the pulling and tube-guiding apparatus forming part of the machine.
Figure 3:
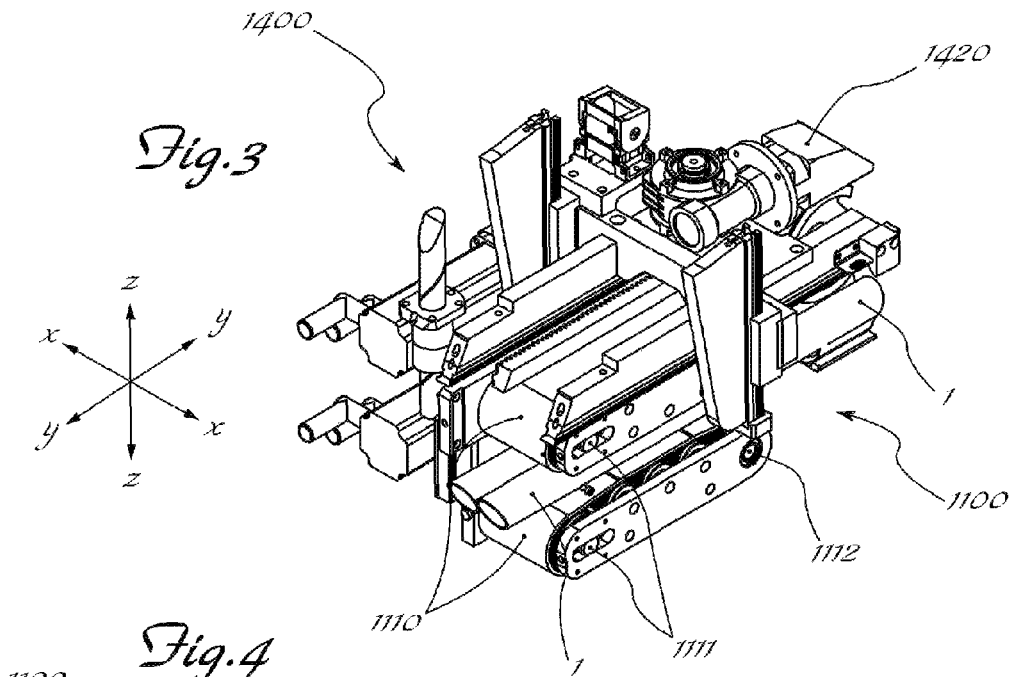
FIG. 3: shows a perspective view from the reel side of the tube pulling device.
Figure 4:
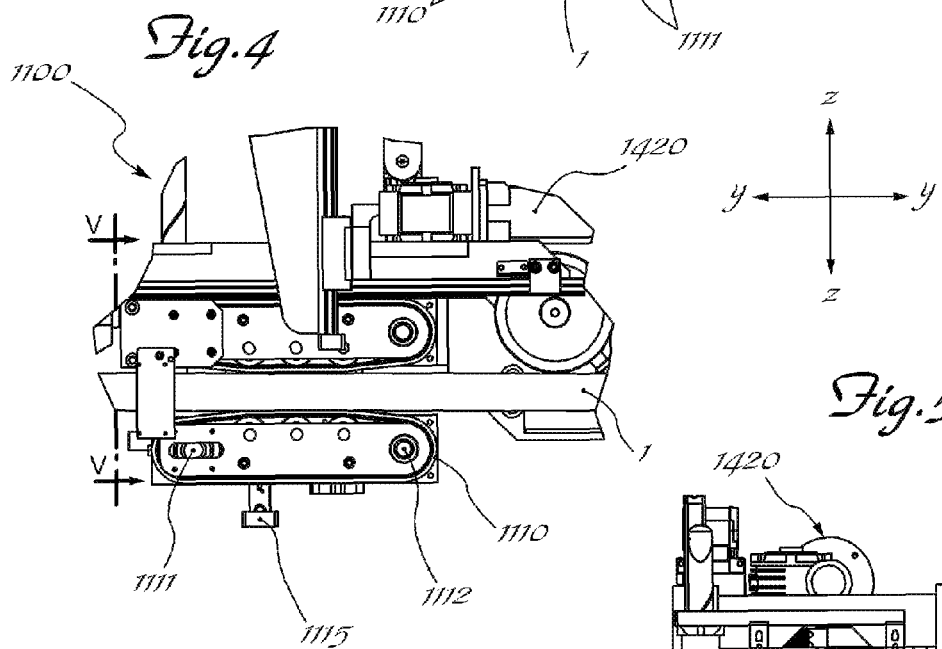
FIG. 4: shows a front view of the pulling device according to FIG. 3.
Figure 5:
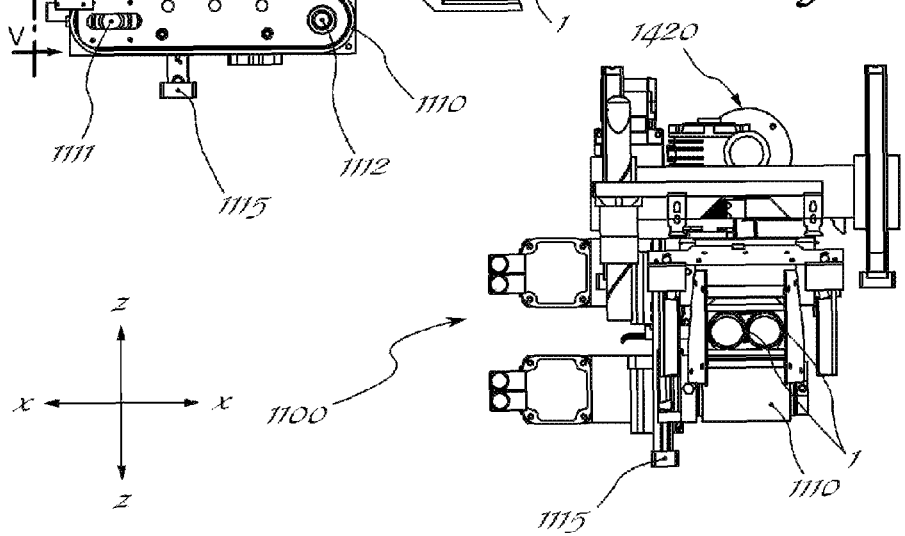
FIG. 5: shows a schematic cross-sectional view along the plane indicated by V-V in FIG. 4.

Referring also to FIG. 2, an apparatus 1000 for feeding and guiding the tubes 1 can be associated with the reel 10 and includes a pulling device 1100 able to guide the two tubes 1 in the advancing direction Y-Y as far as the point of entry thereof onto the winding reel 10, while keeping the tubes 1 adjacent to each other in the longitudinal direction X-X and already defining the perfect position for an optimum staggered ("quinconce") arrangement.

For this type of production, in fact, the speed of the two tubes is preferably the same since a different advancing speed could result in an excessive accumulation of the faster tube and therefore prevent the formation of a well-wound compact roll. For this reason, means (not shown) are provided for controlling and synchronizing the two extruders which produce the tube (if the tube is supplied directly by means of series production) or two rolls (if the tube has already been produced and needs only to be supplied to the reel by means of unwinding), or finally a roll and the extruder (if the supply is mixed).

The means for controlling and synchronizing can include a computer processor configured to execute computer readable instructions that are configured carry out and/or implement the functionality described herein. For example, the means for controlling and synchronizing can include a computer that is connected to one or more sensors (e.g., in a feedback loop configuration) and to the motors described herein in order to control the motors. The computer readable instructions can be stored in a tangible computer readable medium such as a magnetic drive, optical disc, RAM, ROM, etc.

The pulling device 1100 preferably includes a pair of belts 1110, which are endlessly wound onto an idle roller 1111 and onto a motor-driven roller 1112 which is rotationally driven by an associated motor 1113. As shown in the figures, the two belts 1110 are preferably arranged opposite to each other on either side of the tube in the vertical direction Z-Z and are connected to means 1115 for adjusting the relative distance between the two belts in order to adapt the pulling device 1300 to different diameters of the tubes 1 and ensure frictional contact with the latter for their advancing movement towards the reel.

Although the drive belts are shown as being flat and arranged opposite each other in the vertical direction Z-Z, it is envisaged that the belts be designed with a concavity corresponding to the convexity of the tubes and arranged opposite each other in the longitudinal direction X-X instead of in the vertical direction Z-Z.

Referring to FIGS. 2 and 6, the pulling device 1100 can supply a tube-guiding device 1200, which is arranged in line and downstream of the pulling device 1100 in the advancing direction of the tubes 1, and comprises two parallel plates 1210 arranged opposite the tubes 1 in the vertical direction Z-Z and two sidewalls 1220 defining a section of the tube-guiding device able to retain and guide the tubes 1 both in the vertical direction Z-Z, and in the longitudinal direction X-X so that the two tubes 1 remain alongside each other during their entry movement onto the reel 10.

FIG. 8 shows a variation of an embodiment of the tube-guiding device 2200 that includes two vertical flanks 2220 and two plates 2210 which house internally two half-guides 2230, the internal surface of which has two recesses 2230a corresponding to the convexity of the tube 1 to be supplied to the reel 10. In this embodiment it can be possible to replace only the half-guides 2230 upon variation in the diameters of the tubes 1 without having to replace the entire tube-guiding device.

The feed device 1100 and the tube-guiding device 1200 can be mounted on a structure 1400 movable in both senses of the longitudinal direction X-X upon operation of a respective first drive system 1410, in both senses of the advancing direction Y-Y upon operation of a second drive system 1420 and in both senses of the vertical direction Z-Z upon operation of a third drive system 1430. These movements in the directions X-X and Z-Z being synchronized with the speed of winding of the tube around the axis X-X in order to produce a perfect wound spiral of tubes arranged alongside each other and on top of each other in a staggered ("quinconce") configuration as shown in FIG. 11. The movements along the axis Y-Y being desirable instead for entry of the tubes onto the reel and for moving the tube-guiding device away from the reel in order to allow the tubes to be cut at the end of winding.

In an embodiment it can be envisaged that, at the outlet opening of the tube-guiding device directed towards the reel, the tube-guiding device has a transverse roller 1211 for facilitating the travel movement of the tube 1.

According to an embodiment, it can also be envisaged that the machine includes an engaging device 1300 (e.g., FIG. 9) able to grip the free end 1a of the two tubes 1 upon entry thereof onto the reel, and to retain the end 1a during winding as well as open again once winding has been completed in order to release the tubes and allow unloading of the roll.

In an embodiment (e.g., FIG. 9) it can also be envisaged that said engaging device is designed in the form of an external finger 1310 which is connected to an arm 12a of the reel 10 and operated in both senses of the radial direction Z-Z by pneumatic or mechanical means (conventional per se and therefore not described in detail) so as to open and allow the entry of the tubes 1 onto the reel and grip the outer surface of the tubes 1 so as to retain them in the longitudinal direction X-X and radial direction Z-Z, ensuring that the tubes remain close to each other during the entire winding step (see FIGS. 10-11). At the end of winding, the finger 1310 can be released so as to eliminate the retaining force acting on the tubes and allow extraction of the roll from the reel in the longitudinal direction X-X and therefore conveying away of the roll for packaging.

According to a further embodiment shown in FIGS. 12-13, the retaining device 2300 can be designed in the form of two independent hooks 2310 which are moved by an associated actuating system 2310a so as to cause the entry of each hook 2310 inside the respective tube 1 in the direction Y-Y of advancing of the tube, which is therefore kept in a position adjacent to the other tube during winding. In this case also, once winding has been terminated, extraction of the arms from the respective tube can be performed so as to allow removal of the roll.

Either one of the embodiments is more suitable depending on the diameter of the tubes and the hardness of the material from which they are made, the internal finger being preferred for softer materials and smaller diameters, while the outer arm is preferred for harder materials and larger diameters.

It is therefore described how, with the winding machine equipped with feed and guiding apparatus according to the disclosure, it is possible to wind in an automatic and extremely precise manner, pairs of tubes which are independent of each other and merely arranged alongside in the longitudinal direction X-X. This can avoids the need for complicated mechanical fastening operations (welding, plastic coating, tying) performed before winding and allows the end user access to the free end of paired tubes in order to apply U-shaped connecting elements to said ends, thus reducing the complexity of the operations required in the prior art and reducing the costs for installation of the tubes in particular in the geothermal sector.

Other embodiments are within the scope and spirit of the invention. For example, due to the nature of software, functions described above can be implemented using software, hardware, firmware, hardwiring, or combinations of any of these. Features implementing functions also be physically located at various positions, including being distributed such that portions of functions are implemented at different physical locations.

Further, while the description above refers to the invention, the description include more than one invention.

What is claimed is:

1. A machine for winding pairs of tubes which are parallel in an advancing direction (Y-Y) and independent of each other in a longitudinal direction (X-X) of a rotation of a reel connected to the machine, the machine comprising:
    an associated motor arranged upstream of the reel relative to the direction of advancing movement of said tubes;
    a pulling device comprising a pair of belts each endlessly wound onto an idle roller and onto a motor-driven roller, the pair of belts being rotationally driven by the associated motor, the pulling device being configured to feed said tubes in the transverse direction (Y-Y) as far as the point of entry thereof onto the winding reel;
    a tube-guiding device that is arranged in-line and downstream of the pulling device, relative to the direction of advancing movement of said tubes, the tube-guiding device including an internal seat that is able to contain said tubes arranged alongside each other in the advancing direction (Y-Y) and guided in the radial direction (Z-Z);
    an engaging device configured to grip free ends of said tubes when said tubes enter onto the reel and i) retain said ends during winding and ii) release said tubes once winding has been completed; and
    a computer configured to control, synchronize, and perform the movements of the different parts and the machining sequences,
    wherein the pair of belts are configured with concavities corresponding to the convexities of the tubes.

2. A machine according to claim 1, wherein the pair of belts is connected to an adjustment mechanism configured to adjust the relative distance between the pair of belts.

3. A machine according to claim 1, wherein the pair of belts are arranged opposite each other on either side of the tube in the vertical direction (Z-Z).

4. A machine according to claim 1, wherein the pair of belts are arranged opposite each other on either side of the tube in the horizontal direction (X-X).

5. A machine according to claim 1, wherein the pair of belts are flat.

6. A machine according to claim 1, wherein the tube-guiding device comprises:
    two parallel plates arranged opposite the tubes in the vertical direction (Z-Z); and
    two side walls
    the two parallel plates and the two side walls defining a section of the tube-guiding device that is configured to retain and guide said tubes both in the vertical direction (Z-Z) and in the longitudinal direction (X-X).

7. A machine according to claim 1, wherein the tube-guiding device comprises two vertical flanks and two plates having, coupled therewith, two half-guides arranged in contact with the outer surface of the tubes.

8. A machine according to claim 7, wherein the inner surface of the two half-guides has two recesses corresponding to the convexity of the tube to be fed to the reel.

9. A machine according to claim 1, wherein the feeding device and tube-guiding device are mounted on a structure movable in both senses of the longitudinal direction X-X upon operation of a respective first drive system and in both senses of the vertical direction (Z-Z) upon operation of a third drive system.

10. A machine according to claim 9, wherein the structure is movable in both senses of the advancing direction (Y-Y) upon operation of a second drive system.

11. A machine according to claim 1, wherein the engaging device comprises a finger which is connected to an arm of the reel and operated in both senses of the radial direction (Z-Z) by pneumatic or mechanical means so as to open and allow the entry of the tubes onto the reel and grip the outer surface of the said tubes so as to ensure retention thereof in the longitudinal direction (X-X) and radial direction (Z-Z).

12. A machine according to claim 1, wherein the retaining device comprises two independent hooks which are moved by an associated actuating system so as to cause the entry of each hook inside the respective tube in the direction (Y-Y) of advancing movement of the latter.

* * * * *